United States Patent [19]

Lloyd et al.

[11] Patent Number: 5,397,211
[45] Date of Patent: Mar. 14, 1995

[54] AUTOMATIC STORAGE AND RETRIEVAL SYSTEM

[75] Inventors: Kurt M. Lloyd, Pewaukee, Wis.; LaMar A. Jones, Sandy, Utah

[73] Assignee: Harnischfeger Engineers, Inc., Brookfield, Wis.

[21] Appl. No.: 278,563

[22] Filed: Jul. 21, 1994

Related U.S. Application Data

[63] Continuation of Ser. No. 42,255, Apr. 2, 1993, abandoned.

[51] Int. Cl.$^6$ .................................................. B65G 1/06
[52] U.S. Cl. .................................... 414/663; 104/246; 104/247; 187/408; 187/410; 414/282; 414/619
[58] Field of Search ................... 414/277–283, 414/662–664, 618, 619; 187/95; 104/244, 246, 247, 178, 173.1

[56] References Cited

U.S. PATENT DOCUMENTS

| | | | |
|---|---|---|---|
| 940,878 | 11/1909 | Jones et al. | 414/282 X |
| 3,490,616 | 1/1970 | Castaldi | 414/280 X |
| 3,638,575 | 2/1972 | Griner | 414/277 X |
| 4,285,623 | 8/1981 | Stephens | 414/282 X |
| 4,712,964 | 12/1987 | Van Elten et al. | 414/281 |
| 4,722,653 | 2/1988 | Williams et al. | 414/222 |
| 4,756,657 | 7/1988 | Kinney | 414/281 |
| 4,773,807 | 9/1988 | Kroll et al. | 414/282 |
| 4,820,109 | 4/1989 | Witt | 414/282 |
| 4,824,311 | 4/1989 | Mims | 414/281 X |
| 5,015,140 | 5/1991 | Kling | 414/282 |
| 5,020,958 | 6/1991 | Tuttobene | 414/281 |
| 5,044,859 | 9/1991 | Sorensen et al. | 414/282 X |
| 5,149,654 | 9/1992 | Gross et al. | 414/282 X |

FOREIGN PATENT DOCUMENTS

| | | |
|---|---|---|
| 0241189 | 10/1987 | European Pat. Off. . |
| 0329642 | 8/1989 | European Pat. Off. . |
| 1547586 | 9/1967 | France . |
| 2630412 | 10/1989 | France . |
| 1235560 | 9/1967 | Germany . |
| 2002749 | 7/1971 | Germany . |
| 2313429 | 6/1974 | Germany . |
| 2130186 | 5/1984 | United Kingdom ............ 414/280 |

Primary Examiner—David A. Bucci
Attorney, Agent, or Firm—Michael, Best & Friedrich

[57] ABSTRACT

A storage and retrieval machine comprising a generally horizontal rail including a rail member, a base, a linear slide supporting the base for movement along the rail member, a generally vertical mast supported by the base, a carriage supported for generally vertical movement along the mast, and an extendable and retractable shuttle mechanism supported by the carriage.

24 Claims, 10 Drawing Sheets

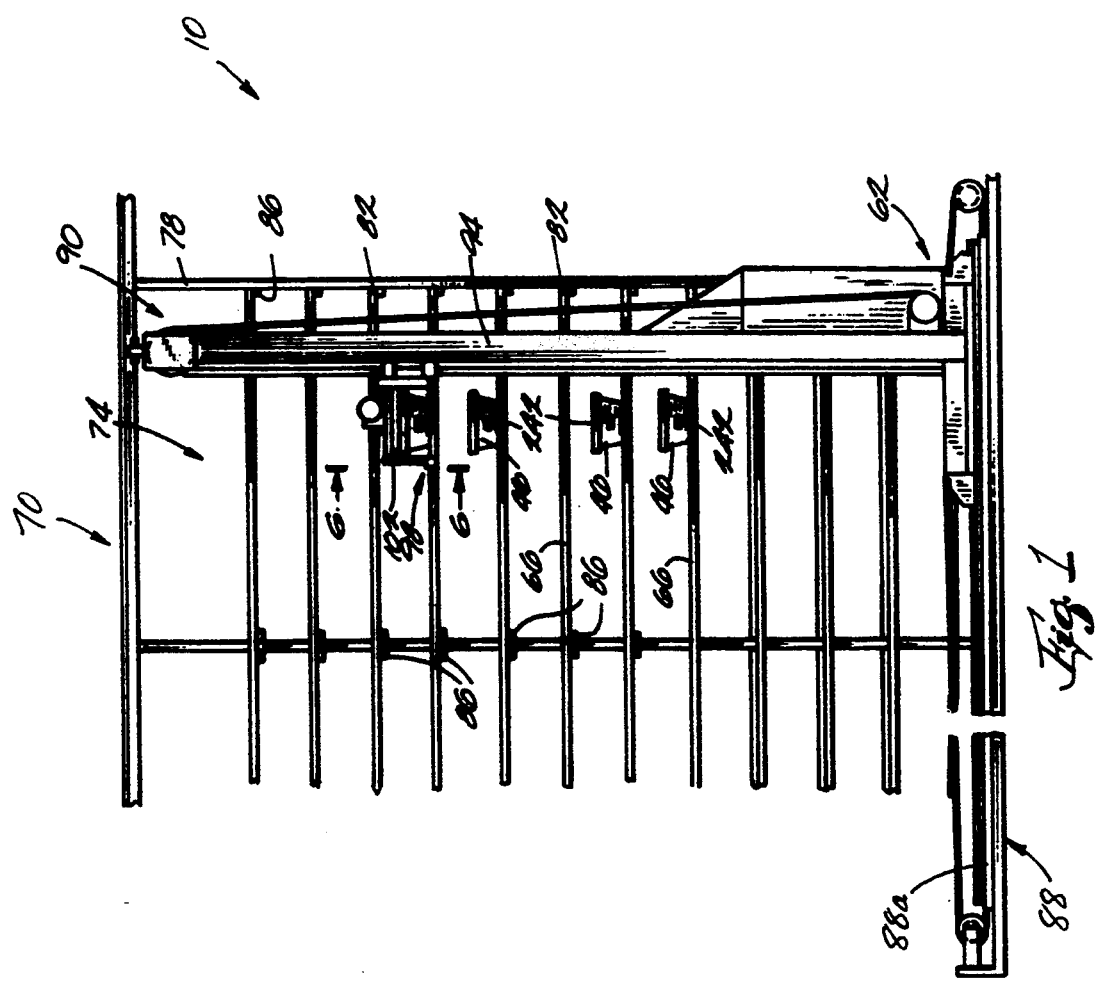

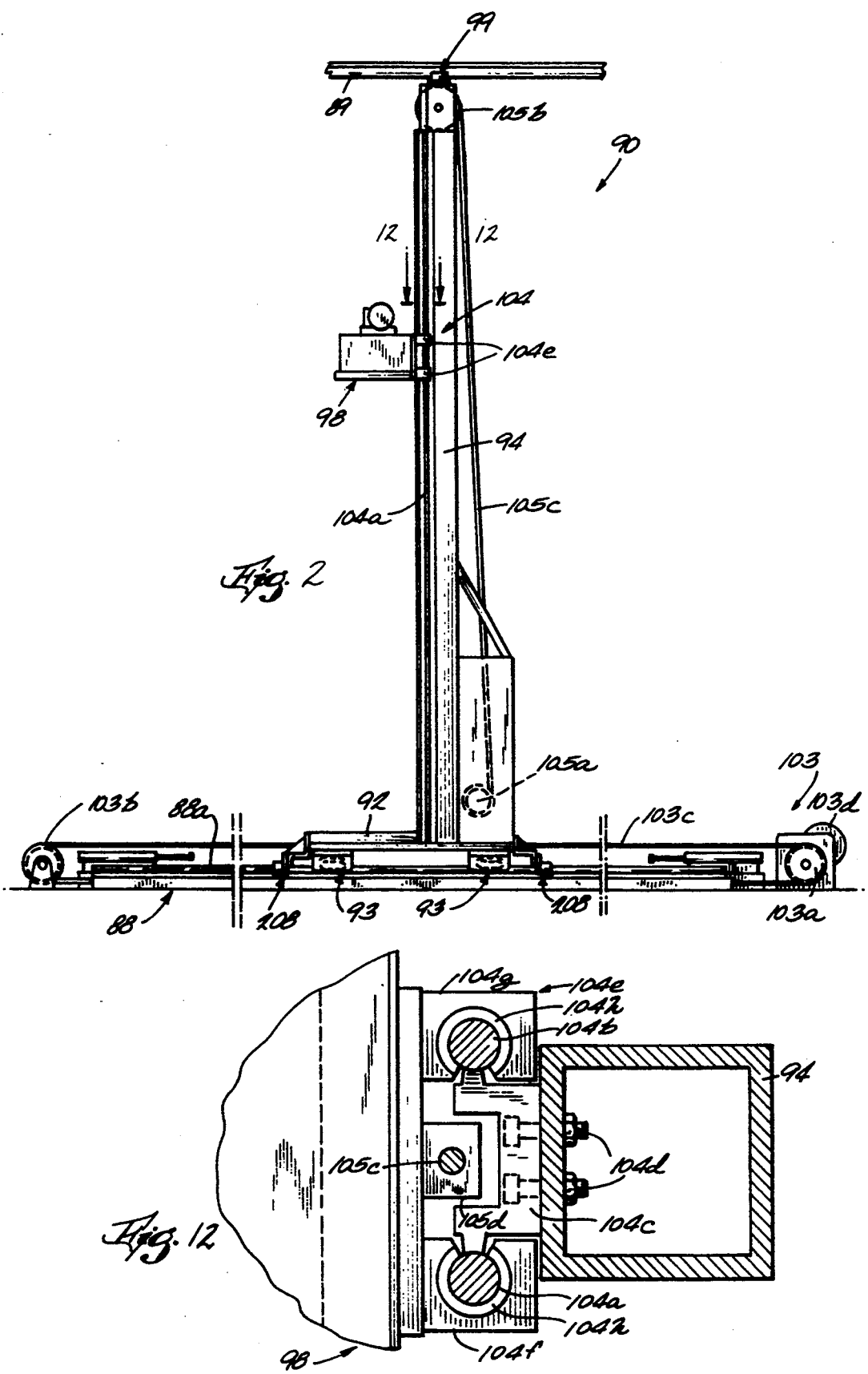

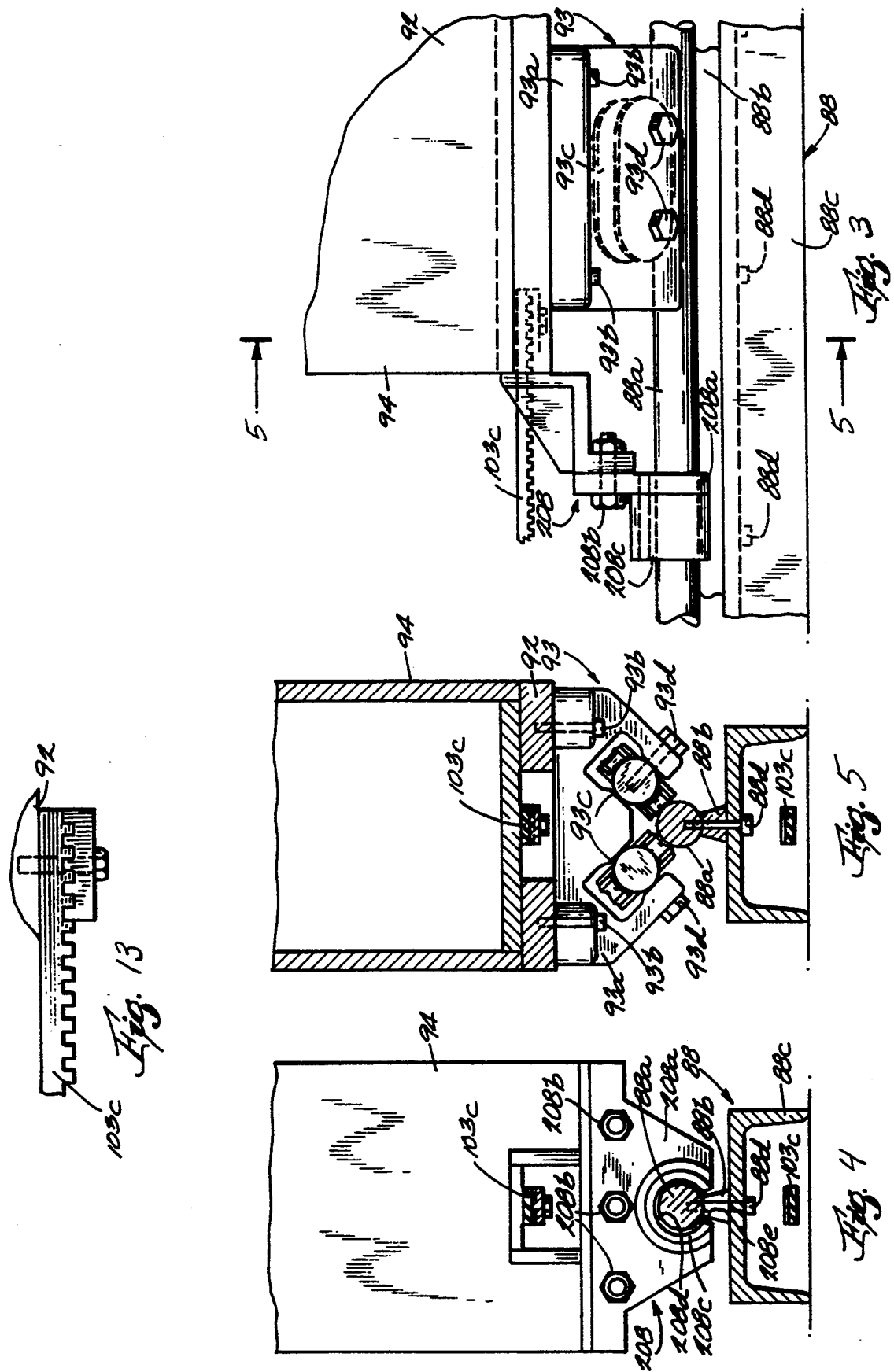

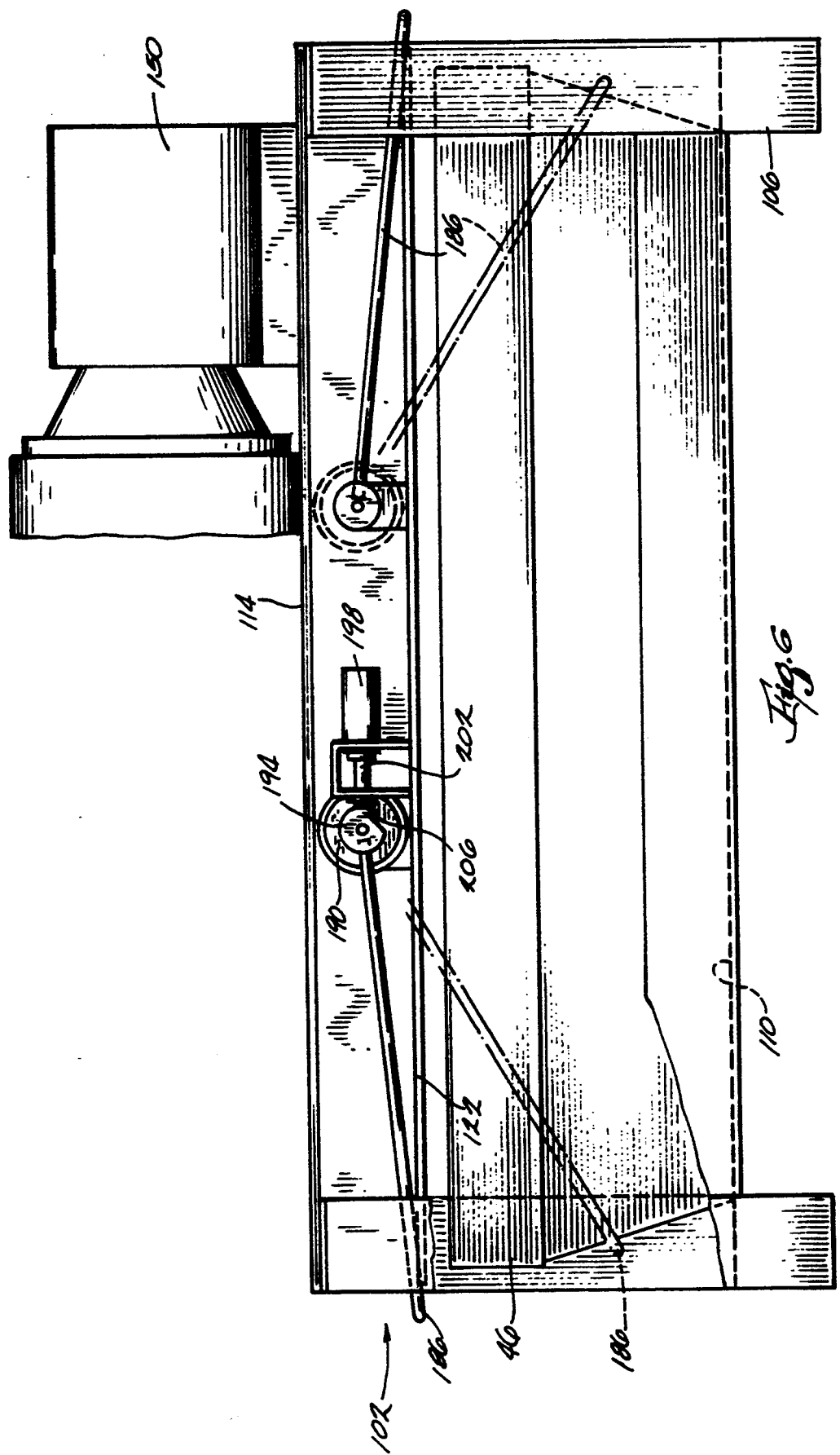

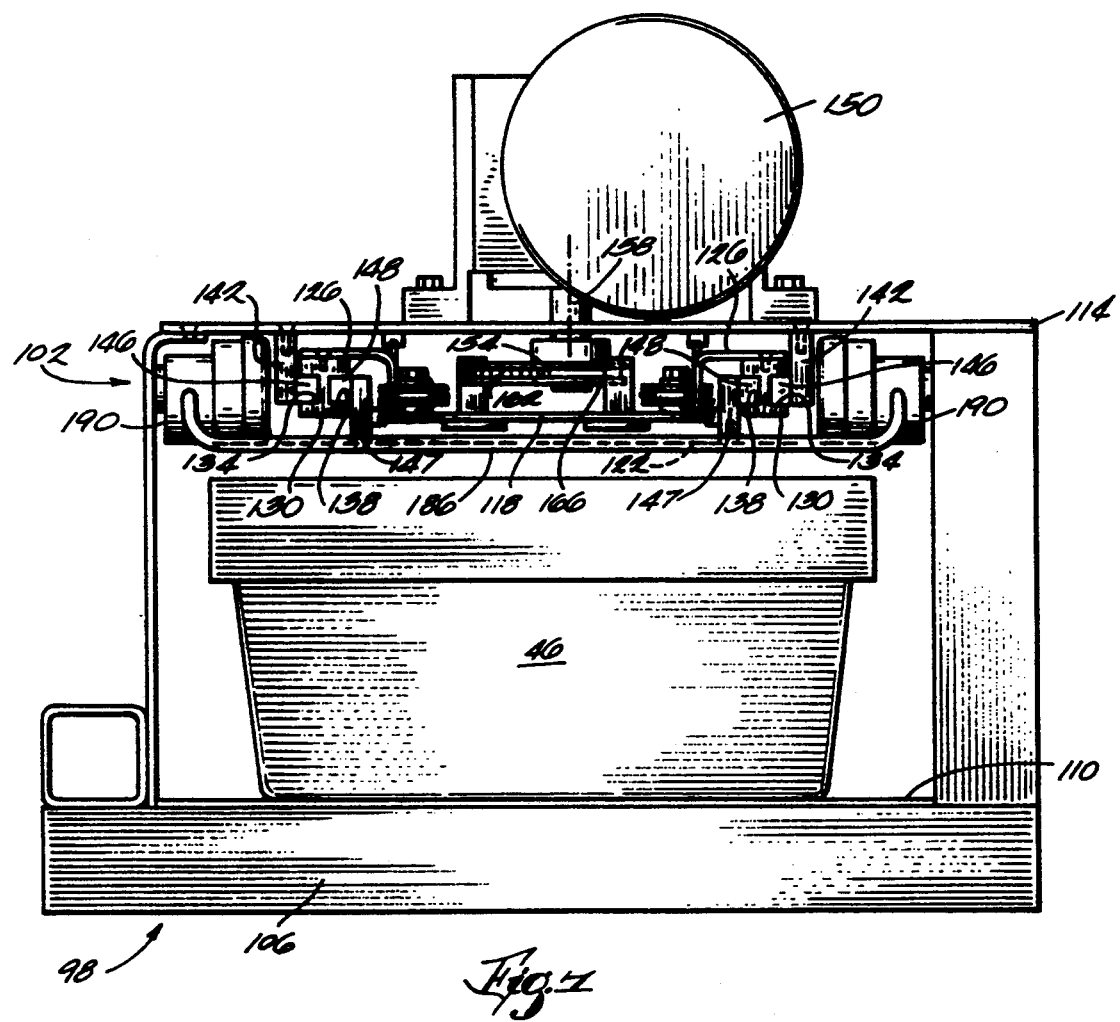

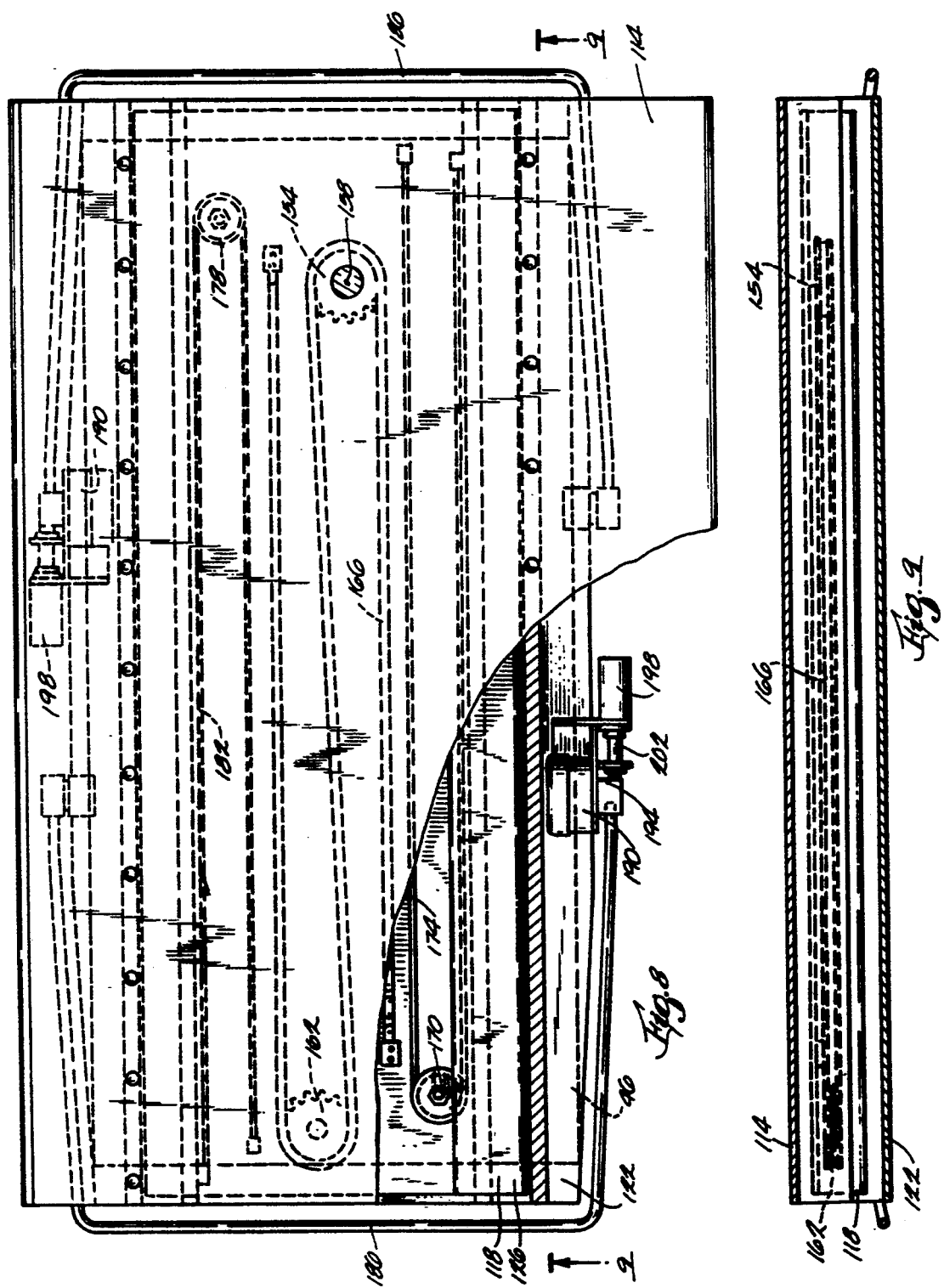

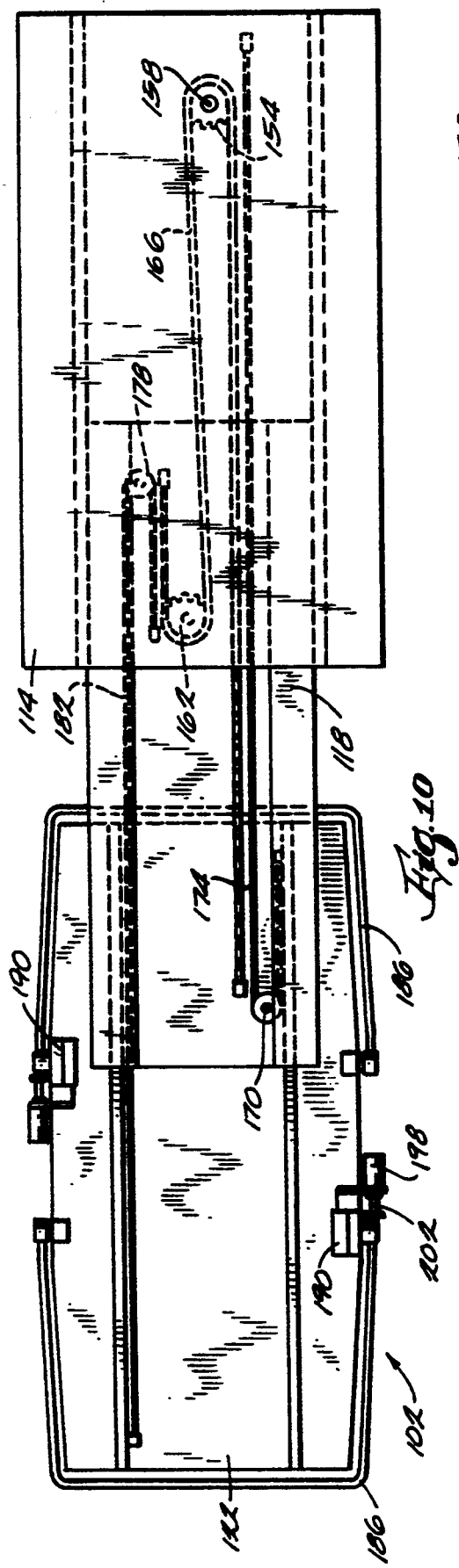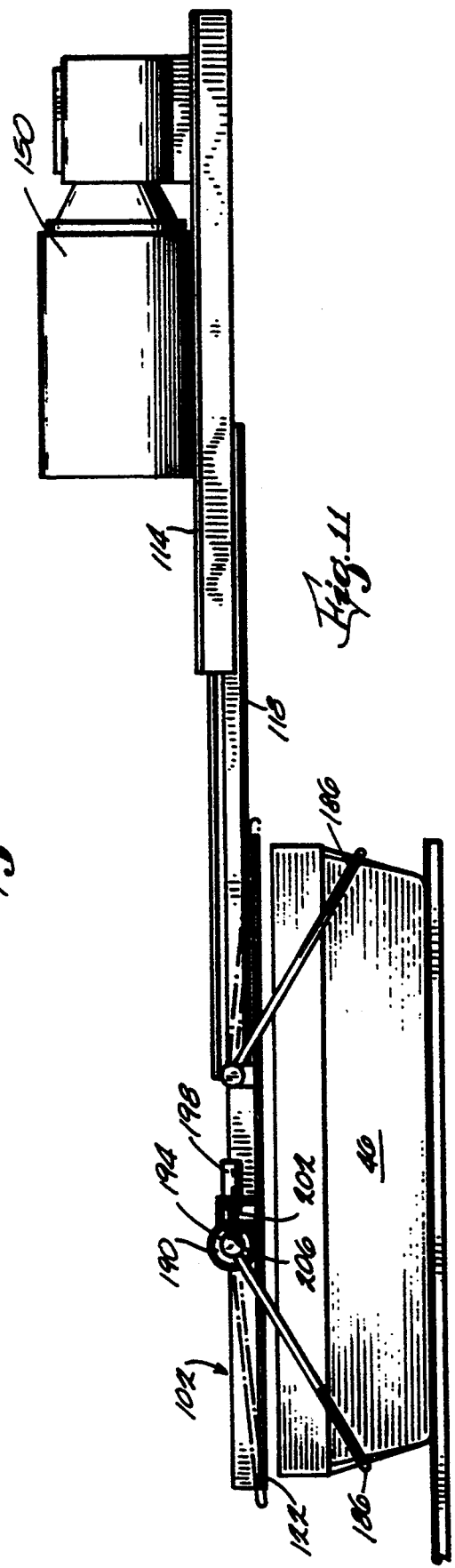

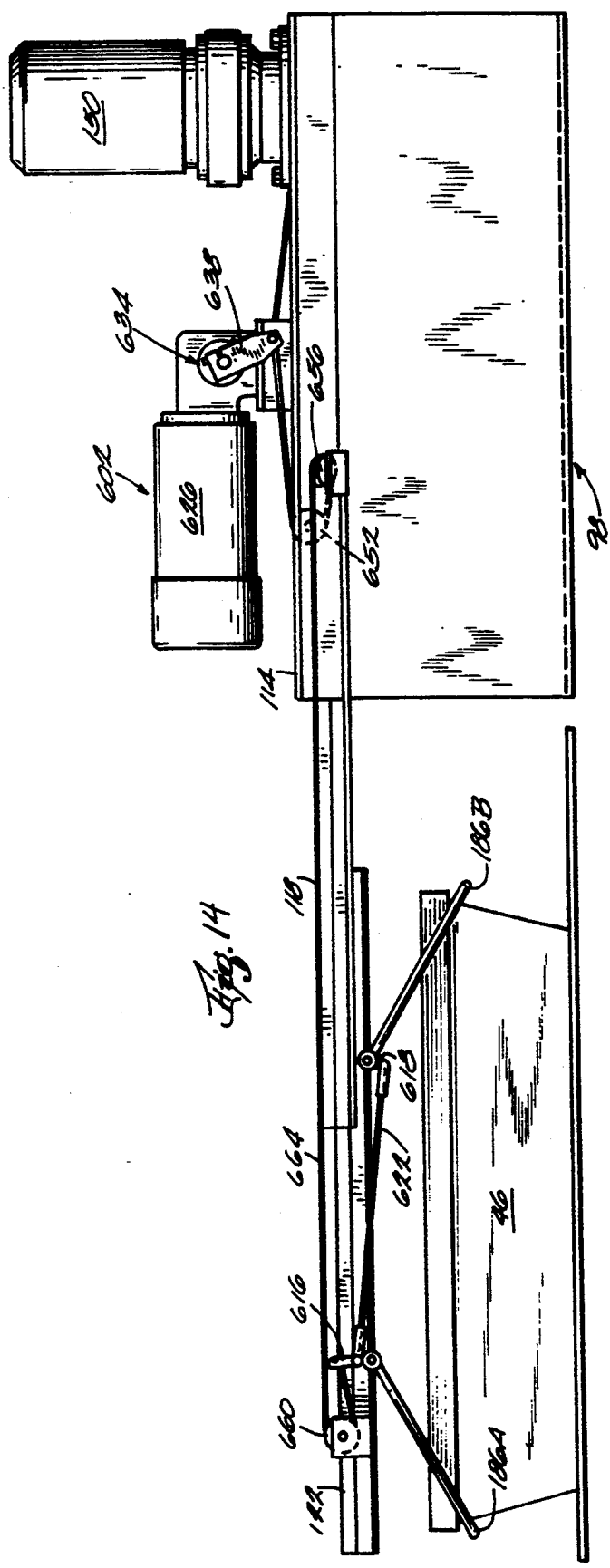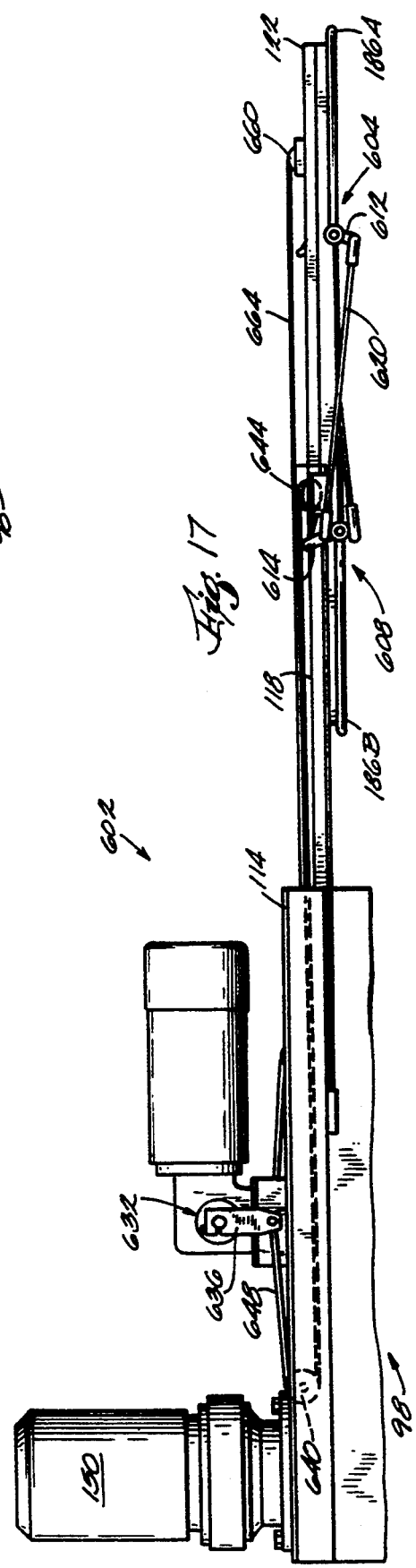

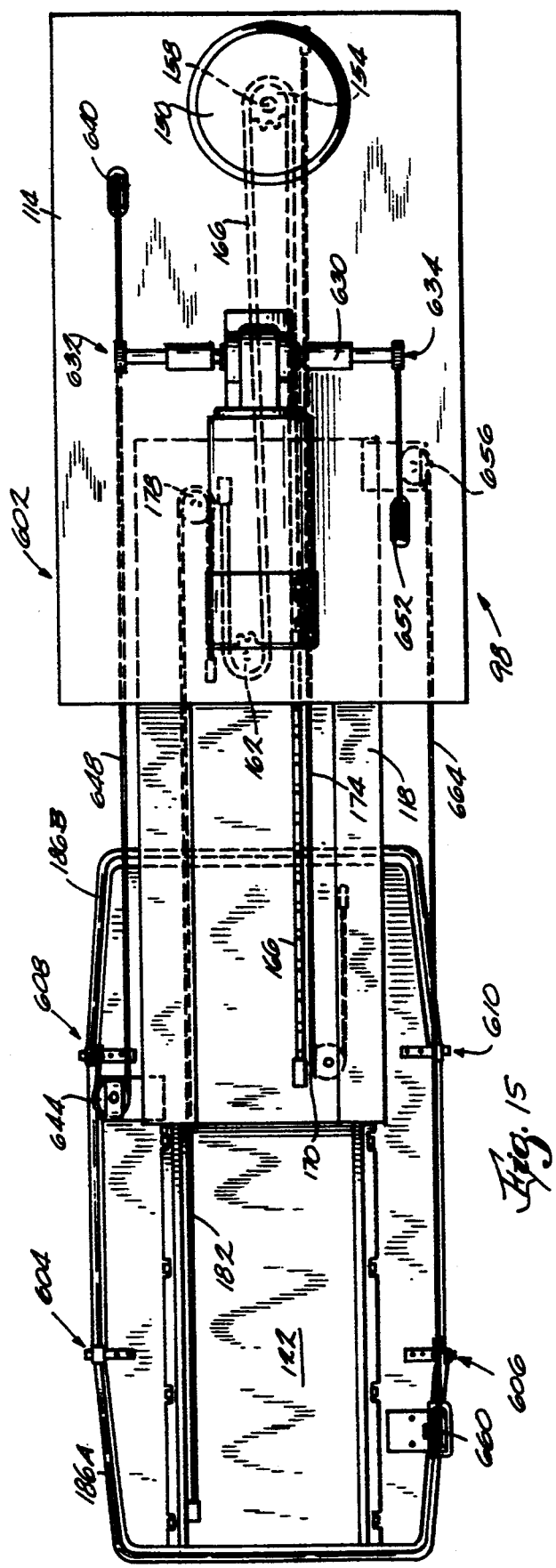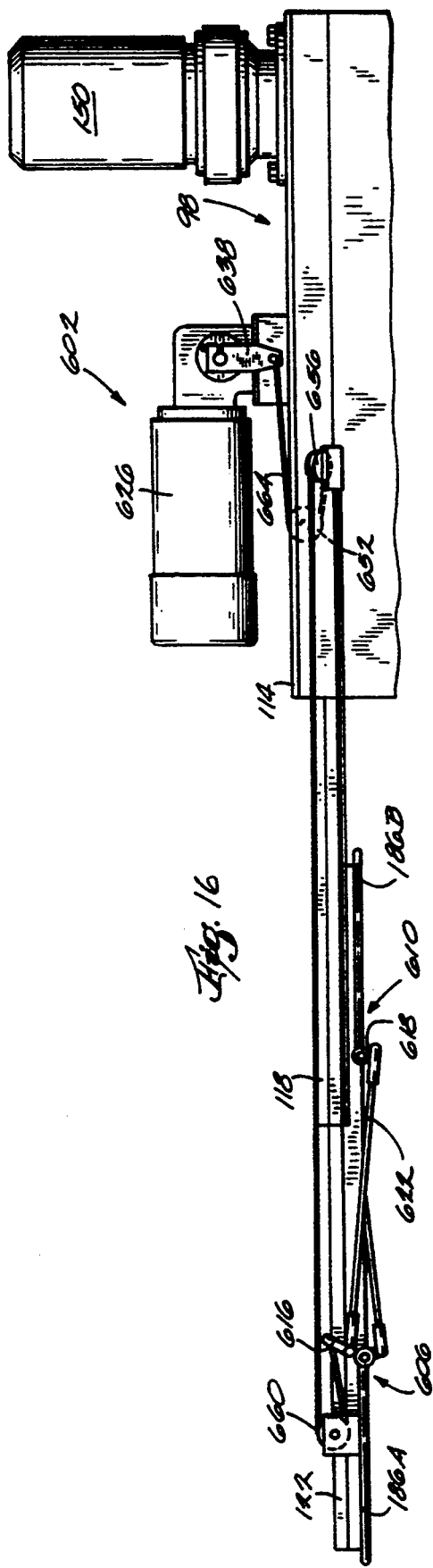

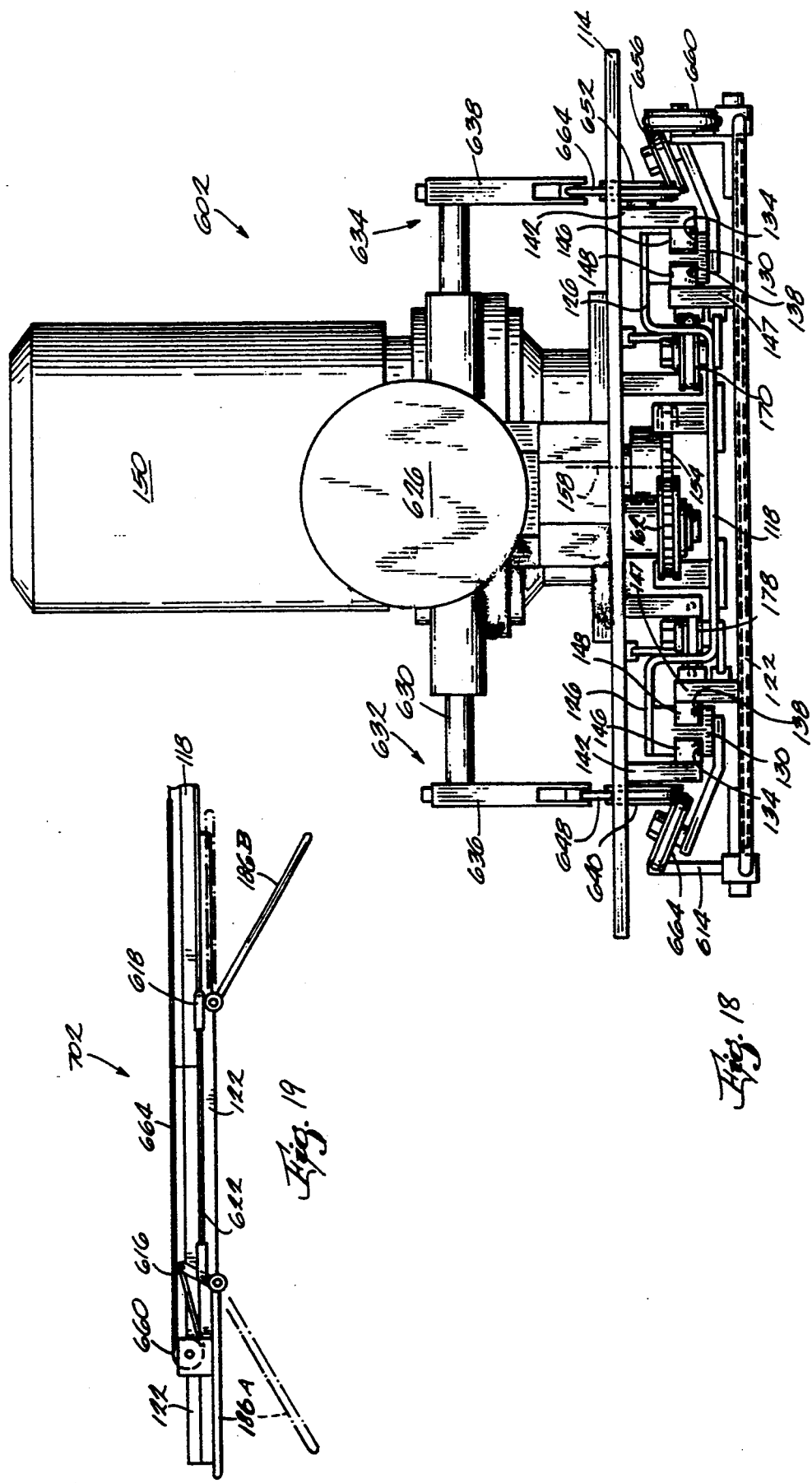

AUTOMATIC STORAGE AND RETRIEVAL SYSTEM

This is a continuation of application Ser. No. 08/042,225, filed Apr. 2, 1993, now abandoned.

FIELD OF THE INVENTION

The invention relates to material handling systems, and more particularly to automatic storage and retrieval systems including storage and retrieval machines for placing objects in and retrieving objects from storage locations, such as are provided by storage racks.

BACKGROUND OF THE INVENTION

Automatic storage and retrieval systems are used in warehouses or other facilities in which objects are to be temporarily stored. A known storage and retrieval system includes a storage rack defining storage compartments or locations, and a storage and retrieval machine (SRM) operable to deposit objects in designated storage locations on the storage rack and to retrieve those objects when desired. The storage and retrieval machine includes a base that is supported on wheels for rolling movement along a track, and an onboard motor drivingly connected to at least one of the wheels to move the storage and retrieval machine along the track. The base supports a vertically extending mast on which a carriage is supported for vertical movement. The carriage is typically supported for movement along the mast by wheels or rollers. The carriage supports an extractor or shuttle mechanism that is horizontally extendable beneath an object so that the object can be lifted from or lowered onto the storage rack.

SUMMARY OF THE INVENTION

The invention provides an automatic storage and retrieval system including an improved storage and retrieval machine that is more smoothly and efficiently operable than prior art storage and retrieval machines. The storage and retrieval machine is supported on a track by linear slides for energy-efficient, substantially frictionless movement along the track. A retainer arrangement is provided on the base of the storage and retrieval machine to maintain alignment on the track with minimum contact between the retainer arrangement and the track. Linear slides are also used to support the carriage on the mast so that movement therebetween is also substantially frictionless.

More particularly, the invention provides a storage and retrieval machine including a base which is supported by a linear slide for horizontal movement along a track, and which is retained on the track by low-friction bearing surfaces that engage the track only when needed to prevent misalignment of the base. To move the storage and retrieval machine, a belt is attached at its opposite ends to the opposite ends of the base and is trained around wheels at the opposite ends of the track. An off-board motor is provided to drive one of the wheels to pull the storage and retrieval machine back and forth along the track. Since the linear slides provide substantially frictionless movement of the storage and retrieval machine, the horsepower requirements of the motor are reduced relative to prior art arrangements, and the storage and retrieval machine is capable of quicker acceleration than are wheel-supported storage and retrieval machines. This permits the storage and retrieval machine to transport objects between storage, object-entry and object-exit locations more quickly.

The storage and retrieval machine also includes a generally vertical mast on the base, and a carriage supported on the mast by additional linear slides that slide along one or more rods extending vertically along the mast. The storage and retrieval machine is provided with an onboard motor to move the carriage up and down the mast. An extendable and retractable shuttle or extractor mechanism is provided on the carriage and is operable to move objects on and off the carriage.

Various other features and advantages of the invention will become apparent to those skilled in the art upon review of the following description, claims and drawings.

DESCRIPTION OF THE DRAWINGS

FIG. 1 is partial side elevational view of an automatic storage and retrieval system embodying the invention.

FIG. 2 is an enlarged side elevational view of the storage and retrieval machine shown in FIG. 1.

FIG. 3 is an enlarged view of a portion of the storage and retrieval machine shown in FIG. 2.

FIG. 4 is a left end view of the storage and retrieval machine portion shown in FIG. 3.

FIG. 5 is a view taken along line 5—5 in FIG. 3.

FIG. 6 is an enlarged view which is taken along line 6—6 in FIG. 1 and which shows the carriage and extractor assembly with the extractor in a retracted position.

FIG. 7 is a left side elevational view of the carriage and extractor assembly shown in FIG. 6.

FIG. 8 is a top plan view, partially broken away, of the carriage and extractor assembly shown in FIG. 6.

FIG. 9 is a view taken along line 9—9 in FIG. 8.

FIG. 10 is a reduced top plan view of the carriage and extractor assembly shown in FIG. 6 with the extractor extended.

FIG. 11 is a side elevational view of the carriage and extractor assembly shown in FIG. 10 and with the extractor in an extended position.

FIG. 12 is a view taken along line 12—12 in FIG. 2.

FIG. 13 is a further enlarged view of a portion of the storage and retrieval machine shown in FIG. 2, showing attachment of the base of the machine to a drive belt.

FIG. 14 is a side elevational view of a carriage and extractor assembly including an alternative extractor construction shown with the extractor extended and the hoops lowered.

FIG. 15 is a top plan view of the carriage and extractor assembly shown in FIG. 14.

FIG. 16 is side elevational view of a portion of the carriage and extractor assembly shown in FIG. 14 but with the hoops raised.

FIG. 17 is a view similar to FIG. 16 showing the opposite side of the extractor.

FIG. 18 is an end elevational view (from the left in FIG. 14) of the extractor in the retracted condition.

FIG. 19 is a partial side elevational view similar to FIG. 14 of a second alternative extractor construction shown with the extractor extended and only one of the hoops lowered.

Before one embodiment of the invention is explained in detail, it is to be understood that the invention is not limited in its application to the details of the construction and the arrangements of components set forth in the following description or illustrated in the drawings.

The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An automatic storage and retrieval system 10 embodying the invention is illustrated in the drawings. The system 10 stores and retrieves objects 46 such as letter trays or bins, for example, and is substantially identical to that disclosed in U.S patent application Ser. No. 042,418, filed concurrently herewith and titled SYSTEM FOR AUTOMATICALLY STAGING LETTERS USED IN CONNECTION WITH LETTER SORTING MACHINE, the specification of which is herein incorporated by reference.

The automatic storage and retrieval system 10 includes means defining a plurality of storage or staging locations 66 (FIG. 1). While various storage location defining means can be employed, in the illustrated embodiment such means includes a modular storage rack 70. The storage rack 70 is made of modules 74. Each module 74 includes a frame 78, seven vertically spaced shelves 82, and cantilever supports 86 which are supported by the frame 78 and which support the shelves 82. As explained in the aforementioned patent application, the storage rack is mounted on top of a sweep rack which includes three levels of conveyors and which, for the purposes of this application, can be considered to be an integral part of the storage rack 70. Each shelf 82 has a continuous upwardly facing horizontal surface that defines a number of horizontally spaced storage locations 66. Use of the cantilever supports 86 allows the shelves 82 to be supported such that there are no partitions between adjacent storage locations 66. Thus, the storage rack 70 defines seven levels of storage locations, and a plurality of bays of storage locations, with each bay including seven vertically aligned storage locations.

The automatic storage and retrieval system 10 also includes (see FIG. 2) a track assembly 88. The track assembly 88 is supported on a suitable supporting surface such as the floor, and in the particular embodiment illustrated in the drawings (see FIGS. 2–5), includes a track that is preferably an elongated cylindrical rail member 88a extending horizontally adjacent the storage rack 70. The underside of the rail member 88a is fixed to support members 88b which are spaced axially along the rail member 88a and which are mounted on a channel-shaped base 88c. Suitable means such as fasteners 88d are provided to secure the components of the track assembly 88 together. The automatic storage and retrieval system also includes (see FIGS. 2 and 20) an upper rail 89 which is preferably supported by the storage rack 70.

The automatic storage and retrieval system 10 also includes (see FIGS. 1 and 2) a storage and retrieval machine 90. The storage and retrieval machine 90 is operable to store objects 46 in and retrieve objects 46 from the storage locations 66 in the storage rack 70.

The storage and retrieval machine 90 includes a chassis or base 92, and means for supporting the base 92 for movement along the track assembly 88 so that the storage and retrieval machine 90 is horizontally moveable relative to the storage rack 70. While various supporting means can be employed, in the illustrated arrangement the supporting means includes (see FIG. 2) a pair of linear slide assemblies 93 supporting the base 92 on the rail member 88a. Referring to FIGS. 3 and 5, each slide assembly 93 includes a V-block 93a mounted (via fasteners 93b) to the underside of the base 92, and two oppositely axially inclined linear bearings or slides 93c mounted on the V-block 93a with fasteners 93d. The linear slides 93c provide substantially frictionless sliding engagement between the storage and retrieval machine 90 and the rail member 88a. Suitable slide assemblies are produced by Thomson Industries, Inc. of Port Washington, N.Y., and are sold under the name Roundway.

As shown in FIG. 2, the storage and retrieval machine 90 also includes a mast 94 extending vertically from the base 92, a carriage 98, and shuttle means for sliding a load onto and off the carriage 98 without exerting an upward force on the load. The upper end of the mast 94 is supported for movement along the upper rail 89 by a pair of wheels or rollers 99 (one is shown in FIG. 2) that are mounted on the mast 94. The shuttle means preferably extends above the load and includes (see FIG. 6) a shuttle or extractor mechanism 102 that is horizontally moveable relative to the carriage 98 for placing objects 46 in and extracting objects 46 from the storage locations 66 in the storage rack 70. While the illustrated system 10 has only one storage rack on one side of the storage and retrieval machine 90, it should be understood that the storage and retrieval machine 90 is capable of accessing a storage rack on the other side of the storage and retrieval machine 90 as well. Thus, the extractor 102 is extendable from both sides of the carriage 98.

To move the storage and retrieval machine 90 horizontally, means are provided for moving the base 92 along the rail member 88a. While various moving means can be employed, in the illustrated arrangement such means includes a drive mechanism 103. As shown in FIG. 2, the drive mechanism 103 includes drive and idler wheels or sprockets 103a and 103b, respectively, supported adjacent opposite ends of the rail member 88a, and a toothed belt 103c trained around the sprockets 103a and 103b and connected (FIG. 13) at its opposite ends to the opposite ends of the base 92 by a bolt or screw. The belt 103c is preferably a POLY CHAIN GT belt manufactured by Gates. A stationary motor 103d is drivingly connected to the drive sprocket 103a via a gear reducer to pull the storage and retrieval machine back and forth along the rail member 88a.

Means are also provided for supporting the carriage 98 on the mast 94 for vertical movement relative thereto. In the illustrated arrangement (see FIG. 2) the means for supporting the carriage 98 on the mast 94 includes a mounting assembly 104 including (see FIG. 12) a pair of spaced apart vertically extending cylindrical rods 104a and 104b. The rods 104a and 104b are fixed to a support bracket 104c that is mounted on the mast 94 by fasteners 104d or by other suitable means. The mounting assembly 104 also includes (FIG. 2) upper and lower bearing assemblies 104e for supporting the carriage 98 for vertical sliding movement along the rods 104a. The upper and lower bearing assemblies 104e are preferably identical and the upper bearing assembly is illustrated in more detail in FIG. 12. Each bearing assembly 104e includes a pair of spaced apart pillow blocks 104f and 104g fixed to the carriage 98, and a bushing, bearing or linear slide 104h mounted in each pillow block. The slide 104h in block 104f slideably receives the rod 104a, and the slide 104h in block 104g slideably receives the rod 104b. Each linear slide 104e extends in excess of 180° around the associated rod 104*a* or 104*b*.

Means are also provided for selectively moving the carriage 98 up and down the mast 94. In the illustrated arrangement (FIG. 2) the moving means includes a motor (not shown) supported on the base 92 for driving a drum 105*a*. The moving means also includes a pulley 105*b* rotatably supported on top of the mast 94, and a cable 105*c* reeved around the drum 105*a* and over the pulley 105*b* and connected to the carriage 98 via (FIG. 12) a mounting block 105*d*.

The carriage 98 and a first construction of the extractor 102 are more particularly illustrated in FIGS. 6 through 11. The carriage 98 includes (see FIGS. 6 and 7) a frame 106 providing an upwardly facing surface 110 for supporting an object 46. The extractor 102 includes an upper plate or top member 114 preferably fixed to the carriage frame 106 in upwardly spaced, parallel relation to the object supporting surface 110. The extractor 102 also includes an intermediate plate or member 118 which is located below the top member 114 and which is supported by the top member 114 for horizontal sliding movement relative thereto. The extractor 102 also includes a lower plate or bottom member 122 which is located below the intermediate member 118 and which is supported by the intermediate member 118 for horizontal sliding movement relative thereto and thus relative to the top member 114.

More particularly, as best shown in FIG. 7, the intermediate member 118 includes, adjacent each corner thereof, an upwardly offset, horizontally extending mounting flange 126. Extending downwardly from each of the flanges 126 is an H-shaped bearing block or slide 130 defining both an outwardly opening bearing track 134 and an inwardly opening bearing track 138. A pair of bearing supporting members 142 extend downwardly from the top member 114. One of the bearing supporting members 142 has mounted thereon an upper slide or bearing strip 146 slidably received in the bearing track 134 of one of the bearing blocks 130, and the other bearing supporting member 142 has mounted thereon a bearing strip 146 slidably received in the bearing track 134 of the other bearing block 130. The bearing strips 146 support the intermediate member 118 for horizontal sliding movement relative to the top member 114. Similarly, a pair of bearing supporting members 147 extend upwardly from the bottom member 122. One of the bearing supporting members 147 has mounted thereon a lower slide or bearing strip 148 slidably received in the bearing track 138 of one of the bearing blocks 130, and the other bearing supporting member 147 has mounted thereon a bearing strip 148 slidably received in the bearing track 138 of the other bearing block 130. The bearing strips 148 support the bottom member 122 for horizontal sliding movement relative to the intermediate member 118. The bearing strips 146 and 148 can be made of any suitable low-friction material.

Means are provided for extending and retracting the extractor 102, i.e., for causing sliding movement of the intermediate and bottom members 118 and 122 relative to the top member 114. While various extending and retracting means can be employed, in the illustrated arrangement this means includes (see FIGS. 6 and 7) a drive motor 150 mounted on the top member 114. The motor 150 is reversible and drives a sprocket 154 (FIGS. 9 and 10) which is located below the top member 114 and which rotates about a vertical axis 158. The means for extending and retracting the extractor 102 also includes an idler sprocket 162 rotatably supported by the top member 114, and a drive chain 166 which is driven by the drive sprocket 154, which passes around the idler sprocket 162, which has a first end fixed to the intermediate member 118 adjacent the right end thereof (as shown in FIG. 8), and which has a second end fixed to the intermediate member 118 adjacent the left end thereof (as shown in FIG. 8). Thus, as is apparent from viewing FIGS. 8 and 10, clockwise rotation of the drive sprocket 154 pulls the intermediate member 118 to the left relative to the top member 114, and counterclockwise rotation of the drive sprocket 154 pulls the intermediate member 118 to the right relative to the top member 114.

The means for extending and retracting the extractor 102 also includes (see FIGS. 8 and 10) an idler pulley 170 pivotally mounted on the intermediate member 118, a cable 174 which is reeved around the pulley 170 and which has one end fixed to the top member 114 and an opposite end fixed to the bottom member 122, an idler pulley 178 rotatably mounted on the intermediate member 118, and a cable 182 which is reeved around the pulley 178 and which has one end fixed to the top member 114 and an opposite end fixed to the bottom member 122. As is apparent from viewing FIG. 8, movement of the intermediate member 118 to the left causes movement of the pulley 170 relative to the top member 114, and such movement of the pulley 170 causes the cable 174 to pull the bottom member 122 to the left relative to the intermediate member 118. Movement of the intermediate member 118 to the right relative to the top member 114 causes movement of the pulley 178 to the right relative to the top member 114, and such movement of the pulley 178 causes the cable 182 to pull the bottom member 122 to the right relative to the intermediate member 118. The cable and pulley arrangements cause the bottom member 122 to move twice as fast as the intermediate member 118.

Thus, clockwise rotation of the drive sprocket 154 causes movement of the intermediate member 118 and bottom member 122 to the left (as shown in FIG. 8), and counterclockwise rotation of the drive sprocket causes movement of the intermediate member 118 and bottom member 122 to the right.

Accordingly, the extractor 102 is operable between a retracted condition (FIG. 6) and an extended condition (FIGS. 10 and 11). In the retracted condition, the intermediate and bottom members 118 and 122 are aligned directly beneath the top member 114 and contained within the carriage so that the members are out of the way and protected during movement of the carriage. In the extended condition, the intermediate member 118 extends outwardly in one direction relative to the top member 114, and the bottom member 112 extends outwardly in the same direction relative to the intermediate member 118.

Means are provided on the bottom member 122 for selectively engaging an object 46 (e.g., a letter tray) beneath the bottom member 122 so that the object moves horizontally in common with the bottom member 122. While the engaging means can be configured to move various objects to permit the storage and retrieval device 90 to be used in other applications, in the illustrated arrangement the engaging means includes (see FIGS. 6, 8, 10 and 11) a pair of generally U-shaped members or hoops 186 each having opposite ends pivotally mounted on the bottom member 122. Referring to FIG. 6, each of the hoops 186 is pivotally moveable between an upper position (shown in solid lines) wherein it extends substantially parallel to the bottom member 122, and a lower position (shown in phantom) wherein it extends transversely and downwardly relative to the bottom member 122. When the hoops 186 are in their upper positions, the bottom member 122 can pass over an object 46 located in the storage rack 70 without interference between the hoops 186 and the object 46. When the hoops 186 are moved to their lower positions, each of the hoops 186 is engageable with a respective end of the object 46 so as to substantially prevent horizontal movement of the object 46 relative to the bottom member 122.

Means are provided for selectively pivoting the hoops 186 relative to the bottom member 122. Such means preferably includes means for simultaneously moving the hoops 186 to their upper positions and for simultaneously moving the hoops 186 to their lower positions. While various hoop pivoting means can be employed, in the embodiment illustrated in FIGS. 6, 8, 10 and 11 such means includes, for each of the hoops 186, a torsional motor or solenoid 190 (FIGS. 6 and 8) which is mounted on the bottom member 122 for movement therewith and which is drivingly connected to one end of the hoop. The solenoid 190 is biased so as to bias the hoop to its upper position, and actuation of the solenoid 190 causes movement of the hoop to its lower position. Means are provided for selectively retaining the hoop in its lower position. This means preferably includes (see FIGS. 6 and 11) a cam 194 fixed to the hoop for pivotal movement therewith about the solenoid axis, and a linear motor or solenoid 198 having an outwardly biased plunger 202 engaging the cam 194. When the hoop moves to its lower position, pivotal movement of the cam allows the plunger 202 to "fall off" a step 206 on the cam, and the plunger thereafter interferes with the step so as to prevent pivotal movement of the cam and the hoop in the opposite direction. Engagement of the step 206 by the plunger 202 therefore prevents movement of the hoop from its lower position. Accordingly, neither of the solenoids needs to be actuated in order to retain the hoop in its lower position. In order to return the hoop to its upper position, the linear solenoid is actuated. This retracts the plunger so that the plunger 202 no longer interferes with the step 206, and this allows the natural bias of the torsional solenoid 190 to return the hoop to its upper position.

This arrangement minimizes the amount of electricity needed to operate the hoops 186. The torsional solenoids 190 naturally bias the hoops 186 to their upper positions. Only a momentary current is necessary to move the hoops 186 to their lower positions. Thereafter, the spring bias of the linear solenoids 198 retains the hoops 186 in their lower positions. Only a momentary actuation of the linear solenoids 198 is necessary to return the hoops 186 to their upper positions. Once the steps 206 clear the plungers 202 of the linear solenoids 198, the linear solenoids 198 can be deactivated.

The carriage and extractor assembly operates as follows. When the supporting surface 110 of the carriage is aligned with a shelf 82 in the storage rack 70, the drive sprocket 154 is rotated clockwise so as to extend the bottom member 122 above an object 46 on the shelf. The hoops 186 (or only the outer hoop if the third embodiment is employed) are then moved to their lower positions to capture the object 46, and the drive sprocket is rotated counterclockwise so as to retract the bottom member 122. Engagement of the object 46 by the hoops 186 causes the object 46 to move with the bottom member 122 and slide off the shelf onto the carriage supporting surface 110. Location of the bottom member 122 immediately above the object 46 substantially prevents letters from coming out of the object 46 during movement of the object 46. The hoops 186 remain in their lower positions during movement of the carriage relative to the storage rack 70.

To prevent the storage and retrieval machine 90 from being derailed, means are provided on the base 92 for preventing its upward movement relative to the rail member 88a. While various movement prevention means can be employed, in the illustrated arrangement such means includes (see FIG. 2) a pair of retainer assemblies 208 positioned outside of the slide assemblies 93 adjacent the opposite ends of the base 92. As shown in FIGS. 3 and 4, each retainer assembly 208 includes a mounting or pillow block 208a fixed to the base 92 by suitable means such as fasteners 208b, and an arcuate bushing, bearing or slide that operates as a retainer 208c. The retainer 208c includes an inner bearing surface 208d that extends beneath the rail member 88a and in excess of 180° around the rail member 88a to provide an opening 208e adjacent the underside of the rail member 88a. The bearing surface 208d defines a bore which communicates with the opening 208e and through which the rail member 88a extends. The opening 208e accommodates the support members 88b. During normal operation of the storage and retrieval machine 90, the bearing surface 208d preferably remains slightly spaced from the rail member 88a, slideably contacting the rail member 88a only when the base 92 becomes slightly misaligned with respect to the rail member 88a.

An alternative extractor or shuttle mechanism 602 is illustrated in FIGS. 14–18. Except as described below, the shuttle mechanism 602 is identical to the shuttle mechanism 102, and common elements have been given the same reference numerals.

In the shuttle mechanism 602, the opposite ends of the hoop 186A are designated by reference numerals 604 and 606, and the opposite ends of the hoop 186B are designated by reference numerals 608 and 610. The end 604 of the hoop 186A has thereon (see FIG. 17) a downwardly extending pivot arm 612, and the end 608 of the hoop 186B has thereon an upwardly extending pivot arm 614. The end 606 of the hoop 186A has thereon (see FIG. 16) an upwardly extending pivot arm 116, and the end 610 of the hoop 186B has thereon a downwardly extending pivot arm 618.

In the shuttle mechanism 602, the means for moving the hoops 186A and 186B includes (see FIG. 17) a first link 620 extending between the pivot arms 612 and 614 (and thus between the hoops 186A and 186B). The means for moving the hoops 186A and 186B also includes (see FIG. 16) a second link 622 extending between the pivot arms 616 and 618 (and thus between the hoops 186A and 186B). Each of the links 620 and 622 is movable substantially longitudinally in opposite directions. The means for moving the hoops 186A and 186B also includes a motor 626 fixed against horizontal movement relative to the carriage 98. The motor 626 is preferably fixed to the upper plate 114. The motor 626 is preferably a reversible brake motor having (see FIG. 15) a horizontally extending output shaft 630 having opposite ends 632 and 634. The shaft end 632 has thereon (see FIG. 17) a downwardly extending lever arm 636, and the shaft end 634 has thereon (see FIG. 16) a downwardly extending lever arm 638. The means for moving the hoops 186A and 186B also includes means for drivingly connecting the motor 626 to the hoops 186A and 186B. Such connecting means preferably includes a cable and pulley arrangement connecting the lever arm 636 to the link 620 and a cable and pulley arrangement connecting the lever arm 638 to the link 622.

The cable and pulley arrangement connecting the lever arm 636 to the link 620 includes (see FIGS. 15 and 17) a pulley 640 pivotally mounted on the upper plate 114 and fixed against horizontal movement relative thereto, and a pulley 644 pivotally mounted on the intermediate plate 118 and fixed against horizontal movement relative thereto. The pulley 640 rotates in a vertical plane, and the pulley 644 rotates in a non-vertical and non-horizontal plane as best shown in FIG. 18. A cable 648 is trained over the pulleys 640 and 644 and has one end fixed to the lower end of the lever arm 636 and an opposite end fixed to the upper end of the pivot arm 614. As seen in FIG. 17, counterclockwise movement of the lever arm 636 acts through the cable 648 to cause clockwise movement of the pivot arm 614 and thereby pivots the hoops 186A and 186B to their upper positions.

The cable and pulley arrangement connecting the lever arm 638 to the link 622 includes (see FIGS. 15 and 16) a pulley 652 pivotally mounted on the upper plate 114 and fixed against horizontal movement relative thereto, a pulley 656 pivotally mounted on the intermediate plate 118 and fixed against horizontal movement relative thereto, and a pulley 660 pivotally mounted on the lower plate 122 and fixed against horizontal movement relative thereto. The pulleys 652 and 660 rotate in a vertical plane, and the pulley 656 rotates in a non-vertical and non-horizontal plane as best shown in FIG. 18. A cable 664 is trained over the pulleys 652, 656 and 660 and has one end fixed to the lower end of the lever arm 638 and an opposite end fixed to the upper end of the pivot arm 616. As seen in FIG. 16, counterclockwise movement of the lever arm 638 acts through the cable 664 to move the pivot arm 616 counterclockwise and thereby pivots the hoops 186A and 186B to their lower positions.

A second alternative extractor or shuttle mechanism 702 is partially illustrated in FIG. 19. Except as described below, the shuttle mechanism 702 is identical to the shuttle mechanism 602, and common elements have been given the same reference numerals.

In the shuttle mechanism 702, the pivot arms 612, 614, 616 and 618 all extend upwardly so that longitudinal movement of either link 620 or 622 causes one of the hoops 186A and 186B to move to its upper position and causes the other hoop 186A and 186B to move to its lower position. For example, as seen in FIG. 19, counterclockwise movement of the lever arm 616 moves the hoop 186A to its lower position and moves the hoop 186B to its upper position.

Various features of the invention are set forth in the following claims.

It is claimed:

1. A storage and retrieval machine comprising
a generally horizontal rail including a single rail member,
a base supported only by said single rail member,
a pair of linear slides which are spaced apart in the direction of said rail member and which support said base for movement along said rail member,
a generally vertical mast having a lower end supported by said base, and having an upper end supported only horizontally,
a carriage supported for generally vertical movement along said mast,
an extendable and retractable shuttle mechanism supported by said carriage,
a stationary motor, and
a flexible member drivingly connecting said motor to said base for moving said base and said mast along said rail member.

2. A machine as set forth in claim 1 wherein said flexible member is an endless belt drivingly connecting said motor to said base.

3. A machine as set forth in claim 2 wherein said rail has opposite ends, wherein said machine further comprises a drive wheel adjacent one of said ends, and an idler wheel adjacent the other of said ends, and wherein said belt is trained around said wheels.

4. A machine as set forth in claim 3 wherein said motor is drivingly connected to said drive wheel.

5. A machine as set forth in claim 1 and further comprising a retainer which is separate from said linear slides, which is normally spaced from said rail member, and which engages said rail member when said base becomes misaligned with said rail member for preventing upward movement of said base relative to said rail.

6. A machine as set forth in claim 5 wherein said retainer includes a bearing surface which extends beneath said rail member and which is normally spaced from said rail member.

7. A machine as set forth in claim 1 wherein said rail member is generally cylindrical.

8. A machine as set forth in claim 7 and further comprising a retainer separate from said linear slides for preventing upward movement of said base relative to said rail, said retainer defining a bore through which said rail member extends.

9. A machine as set forth in claim 1 and further comprising a linear slide supporting said carriage for vertical movement along said mast.

10. A machine as set forth in claim 9 and further comprising a pair of generally vertical, spaced rods fixed to said mast, and wherein said machine comprises four linear slides supporting said carriage, two of said slides being vertically spaced and engaging one of said rods, and the other two of said slides being vertically spaced and engaging the other of said rods.

11. A machine as set forth in claim 1 and further comprising a generally horizontal upper rail having opposed generally vertical surfaces, and wherein said upper end of said mast is supported by rollers that roll along said vertical surfaces of said upper rail.

12. A machine as set forth in claim 1 wherein said rail member has an underside and a length, and wherein said underside of said rail member is supported along substantially the entire length of said rail member.

13. A machine as set forth in claim 1 wherein said linear slide does not prevent upward movement of said base relative to said rail member.

14. A machine as set forth in claim 1 wherein said mast is moved in the direction of said rail member solely by said base.

15. A machine as set forth in claim 1 wherein said linear slides do not prevent upward movement of said base relative to said rail member.

16. A storage and retrieval machine comprising
a generally horizontal rail including a generally cylindrical rail member, said rail member having an underside, said rail also including a support member extending downwardly from said underside of said rail member,
a base,
a linear slide supporting said base for movement along said rail member,
a generally vertical mast supported by said base,
a carriage supported for generally vertical movement along said mast,
an extendable and retractable shuttle mechanism supported by said carriage, and
a retainer separate from said linear slide for preventing upward movement of said base relative to said rail, said retainer defining a generally cylindrical bore through which said rail member extends, said bore having a lower portion, and said retainer also defining an opening which communicates with said lower portion of said bore and through which said support member extends.

17. A storage and retrieval machine comprising a generally horizontal track having opposite ends and including a generally cylindrical rail member having an underside, and a support member extending downwardly from said underside of said rail member, a base, a linear slide supporting said base for movement along said rail member, a drive wheel adjacent one of said rail ends, an idler wheel adjacent the other of said rail ends, a belt which is trained around said wheels and which drivingly connects said drive wheel to said base, a stationary motor drivingly connected to said drive wheel for moving said base along said rail member, a retainer separate from said linear slide for preventing upward movement of said base relative to said rail, said retainer defining a generally cylindrical bore through which said rail member extends, said bore having a lower portion, and said retainer also defining an opening which communicates with said lower portion of said bore and through which said support member extends, a generally vertical mast supported by said base, a pair of generally vertical, spaced rods fixed to said mast, a carriage, four linear slides supporting said carriage for vertical movement along said mast, two of said slides being vertically spaced and engaging one of said rods, and the other two of said slides being vertically spaced and engaging the other of said rods, and an extendable and retractable shuttle mechanism supported by said carriage.

18. A machine as set forth in claim 17 and wherein said retainer is normally spaced from said rail member and engages said rail member when said base becomes misaligned with said rail member for preventing upward movement of said base relative to said rail.

19. A machine as set forth in claim 17 wherein said base is supported only by said single rail member, and wherein said mast has a lower end supported by said base and has an upper end supported only horizontally.

20. A machine as set forth in claim 19 and further comprising a generally horizontal upper rail having opposed generally vertical surfaces, and wherein said upper end of said mast is supported by rollers that roll along said vertical surfaces of said upper rail.

21. A machine as set forth in claim 17 wherein said rail member has a length, and wherein said underside of said rail member is supported along substantially the entire length of said rail member.

22. A machine as set forth in claim 17 wherein said linear slide does not prevent upward movement of said base relative to said rail member.

23. A storage and retrieval machine comprising
a generally horizontal rail including a rail member,
a base,
a linear slide supporting said base for movement along said rail member,
a generally vertical mast supported by said base,
a carriage supported for generally vertical movement along said mast,
an extendable and retractable shuttle mechanism supported by said carriage, and
a retainer which is separate from said linear slide, which is normally spaced from said rail member, and which engages said rail member when said base becomes misaligned with said rail member for preventing upward movement of said base relative to said rail.

24. A storage and retrieval machine comprising
a generally horizontal rail including a single rail member having opposite ends,
a base,
a pair of linear slides which are spaced apart in the direction of said rail member, which do not prevent upward movement of said base relative to said rail member, and which support said base for movement along said rail member such that said base is supported only by said single rail member,
a generally vertical mast having a lower end supported by said base, and having an upper end supported only horizontally and supported for movement in the direction of said rail member, said mast being moved in the direction of said rail member solely by said base,
a carriage supported for generally vertical movement along said mast,
an extendable and retractable shuttle mechanism supported by said carriage,
a drive wheel adjacent one of said ends of said rail member,
an idler wheel adjacent the other of said ends of said rail member,
a motor drivingly connected to said drive wheel, and
a flexible belt which is trained around said wheels and which drivingly connects said motor to said base for moving said base along said rail member.

* * * * *